(12) United States Patent
Schirling

(10) Patent No.: US 7,784,379 B2
(45) Date of Patent: Aug. 31, 2010

(54) COVER FOR MACHINE TOOL GUIDE STRUCTURES

(75) Inventor: Michael Schirling, Nürtingen (DE)

(73) Assignee: Gebr. Heller Maschinenfabrik GmbH, Nurtingen (DE)

( * ) Notice: Subject to any disclaimer, the term of this patent is extended or adjusted under 35 U.S.C. 154(b) by 810 days.

(21) Appl. No.: 11/729,000

(22) Filed: Mar. 28, 2007

(65) Prior Publication Data

US 2007/0230836 A1 Oct. 4, 2007

(30) Foreign Application Priority Data

Apr. 3, 2006 (DE) ........................ 10 2006 015 799

(51) Int. Cl.
*B23Q 11/08* (2006.01)

(52) U.S. Cl. .................. 74/608; 74/612; 160/84.06; 160/202; 160/223

(58) Field of Classification Search .............. 74/608, 74/612, 613; 52/67; 160/84.06, 202, 222, 160/223; 409/134; 408/241 G; 451/451; *B23Q 11/08*
See application file for complete search history.

(56) References Cited

U.S. PATENT DOCUMENTS

| | | | | |
|---|---|---|---|---|
| 3,824,890 A | * | 7/1974 | Zettler et al. ........... | 409/134 |
| 4,596,162 A | * | 6/1986 | Walter et al. ........... | 74/608 |
| 5,156,195 A | * | 10/1992 | Wehler et al. .......... | 160/202 |
| 5,263,800 A | * | 11/1993 | Chen ..................... | 409/137 |
| 5,807,043 A | * | 9/1998 | Blank .................... | 409/134 |
| 2002/0051687 A1 | * | 5/2002 | Harami et al. .......... | 409/134 |

FOREIGN PATENT DOCUMENTS

| | | |
|---|---|---|
| DE | 830 445 | 8/1950 |
| DE | 0 433 534 A1 | 6/1991 |
| DE | 36 35 874 C2 | 4/1995 |
| DE | 195 38 636 A1 | 4/1997 |
| DE | 201 15 094 U1 | 1/2002 |
| DE | 196 07 370 C2 | 4/2002 |
| DE | 102 23 044 A1 | 1/2003 |
| DE | 102 17 115 B4 | 10/2005 |
| WO | WO 02/30615 A | 4/2002 |

* cited by examiner

*Primary Examiner*—Richard W Ridley
*Assistant Examiner*—Thomas Diaz
(74) *Attorney, Agent, or Firm*—R. S. Lombard; K. Bach

(57) ABSTRACT

In a cover arrangement for a machine tool for covering guide and drive structures, comprising a pleated wall arrangement which can be expanded and compressed upon movement of a carriage between which and a machine wall it is connected. The pleated wall structures is provided with armor lamellas which are anchored to the pleat sections of the wall structures and over-lap for covering the pleated wall structure which is movably supported on guide tracks which are disposed in planes extending at an obtuse angle facilitating installation and removal of the cover arrangement.

20 Claims, 5 Drawing Sheets

COVER FOR MACHINE TOOL GUIDE STRUCTURES

CROSS-REFERENCE TO RELATED APPLICATION

This application claims the priority benefits of German Application No. 10 2006 015 799.0-14 filed Apr. 3, 2006.

BACKGROUND OF THE INVENTION

This invention relates to a cover for a machine tool, particularly for covering guide structures and/or drives.

Machine tools include, for example, movably supported carriages for supporting a workpiece or a device for holding a workpiece or a carriage supporting one or more machining spindles. The respective carriage is supported, for example, on a machine frame by means of linear guide structures which need to be protected from dirt and dust.

To this end, German patent, DE 102 23 044 A1 discloses self-supporting bellows structure with U-shaped bent metal sheets, which are interconnected by pleat structures. The U-shaped metal sheets form an armor for the protection of the pleated wall structure. The legs of a U-shaped metal sheet accommodate there between the respective adjacent U-shaped metal sheet.

This arrangement results in a cover arrangement of relatively large width. A corresponding space is often not available in modern machinery.

German Patent, DE 201 15 094 U1 also discloses a cover arrangement which is in the form of a double bellows structure. It includes two pleated wall arrangements interconnected by web walls which also results in a relatively thick, space consuming structure.

German Patent, DE 36 35 874 C2 discloses a bellows arrangement with a lamella armor structure wherein the individual lamellas are connected to intermediate walls of the pleated wall arrangement. The lamellas are straight. They abut one another loosely.

This applies in a similar way to German patent, DE 196 07 370 C2 which also discloses a cover structure for machine tools. The cover structure consists of a pleated wall structure with straight lamellas for protection.

Cover arrangements for machine tools encounter various problems. It is, for example, important that the covers can be easily and rapidly removed. If, for example, a service technician needs to service the guide structure or the drive structures or the drives for the respective drive structures, he first has to remove the covers. This should be possible rapidly and easily, preferably within less than 20 minutes. This is not only time for the servicing of guide structures and drives, but also for the exchange of the covers which, in themselves, are parts subject to wear so that they need to be replaced from time-to-time. If they fail, the machine tool becomes inoperative.

Furthermore, lamellas possibly provided for armoring must be as tight as possible to prevent chips from entering. If, with the usual wet machining relatively harmless chips are deposited which can be flushed away from the cover with an oil flow or a coolant flow, fine chips as they are formed during dry machining can cause substantial damage on the covers. Such chips must be prevented from reaching the covers and damaging the covers or from passing through the covers to the guide structures.

Furthermore, modern machine tools are often set up in tight spaces, so that only little room remains for covers.

It is therefore, the object of the present invention to provide machine tool covers which can be easily installed and removed and which do not require excessive installation spaces.

SUMMARY OF THE INVENTION

The present invention provides a cover arrangement for a machine tool for covering guide and drive structures, comprising a pleated wall arrangement which can be expanded and compressed upon movement of a carriage between which and a machine wall it is connected. The pleated wall structure is provided with armor lamellas which are moveably anchored to flexible pleat sections of the wall structure, the lamellas over-lap for covering the pleated wall structure which is movably supported on guide tracks which are disposed in planes which extend at an obtuse angle facilitating installation and removal of these cover arrangements.

The cover arrangement includes a pleated wall structure which is protected by armor comprising strip-like lamellas. The cover arrangement is guided by two guide tracks with guide recesses extending along the edges of the cover arrangement. They are so arranged that they lie in planes which extend at an obtuse angle, preferably, in the range of 140 degrees to 160 degrees. When the cover is disconnected at its opposite ends and pushed together, it is only supported by the guide tracks. Because of the mechanism of the guide recesses relative to one another and because of the flexibility of the pleated wall structure, it can easily be removed as a whole from the guide tracks. It is not necessary to separate the individual parts of the pleated wall arrangement and the armor. The cover arrangement can then be set aside and, after maintenance or otherwise on the guide structure and drives normally covered by the cover arrangement; it can be re-installed by inserting it in a pushed-together state into the space between the guide tracks.

During the installation and the removal of the cover arrangement, the individual elements provided with the guide recesses, which may be, for example, corresponding intermediate wall elements of the pleated wall arrangement, are rotated in a certain direction or around an axis which extends transverse to the direction of movement of the pleated wall arrangement and preferably about normal to the guide tracks. The time required for the removal and for the installation of the pleated wall is substantially less than 20 minutes. This is also possible if the cover arrangement is relatively long, wide, or heavy.

The cover arrangement comprises intermediate wall elements which are arranged preferably essentially parallel to one another and in which the guide recesses are formed. The intermediate wall elements may consist of plastic, for example, polyvinyl chloride, PVC or another suitable plastic material. The guide tracks, on the other hand, preferably consist of metal, especially steel. This material pairing permits the operation of the cover arrangement without noticeable wear and without noise.

The guide recesses have preferably a depth which is greater than their width. They have a rectangular cross-section, for example. The intermediate elements are supported with some play on the guide tracks which extend in the longitudinal direction, preferably, also parallel to one another and in the transverse direction. The guide tracks are oriented at an obtuse angle with respect to each other. The guide tracks have a cross-section corresponding to the guide recesses, for example, a rectangular cross-section. The play is so selected that the intermediate wall elements can easily be moved in the longitudinal direction of the guide tracks, but at the same time are firmly held on the tracks as long as they are not turned in a direction transverse to the guide tracks in the way explained above. This, however, is only possible when the ends of the cover arrangement are disconnected from the respective machine elements. In an installed state the cover arrangement is therefore, safely held by the guide tracks and the machine tool.

Preferably, the guide track and the guide recesses are designed so as to engage one another without undercut or seizing. This facilitates installation and removal, in that the cover arrangement can be particularly easily separated from the guide tracks.

Preferably, the lamellas are connected to the intermediate wall elements. This, in connection with the pleated wall arrangement facilitates an automatic adjustment and the movement of the lamella.

It has been found to be expedient to form the lamella of the armor in such a way that they are bent around a line which extends parallel to the cover arrangement. In this way, the lamellas can be pre-loaded so that they abut one another particularly if the lamellas are anchored to the pleated wall arrangement and, particularly, to the intermediate wall elements. If each lamella abuts with its edge, the outer surface of the adjacent lamella with some bias, chips can be prevented from entering the space covered by the lamellas. The steel lamellas can therefore be chip-tight. To this end, they are anchored on one hand in the pleated wall arrangement and, on the other hand, they are so formed that they bridge the whole width of the gap, whereby, with the stiffening achieved thereby, the lamellas are held in firm mutual engagement. Furthermore, when they are pushed together, a relatively thin packet is formed. This is particularly true if the angle between the ends of each lamella as measured over the bending line is in the range of 130 to 170 degrees, preferably 140 to 160 degrees.

Preferably, the lamellas are not only curved, but are angled at a bending line at an obtuse angle. This facilitates the manufacture by providing over seeable geometric conditions, for good lamella wall contact and small packet thickness.

Preferably, each lamella is provided with an edge which is inclined toward an adjacent lamella, in order to provide for line contact with the adjacent lamella. This provides for a good seal between the lamellas.

In a further advantageous embodiment of the machine tool according to the invention, the guide recesses of the pleated wall arrangement are arranged, for example, at the top end of the cover arrangement on the outside and at the lower edge at the inside of the pleated wall arrangement. This arrangement can be provided particularly if the guide recesses are formed on intermediate wall elements which, if necessary, may protrude over the upper and/or the lower edges of the pleated wall arrangement. This concept facilitates the use of different cover arrangements at opposite sides of the carriage moving along the guide tracks. For example, one cover arrangement may be provided, which is guided at the top outside and at the bottom inside, whereas, the other cover arrangement is guided on the outside at the top and also at the bottom or, alternatively, at both ends at the inside. In this way, different space conditions at opposite sides of the carriage can be taken into consideration which may occur, for example, by the only one-sided presence of a drive.

The invention will become more readily apparent from the following description, thereof on the basis of the accompanying drawings.

DESCRIPTION OF THE PREFERRED EMBODIMENTS

Figure 2:
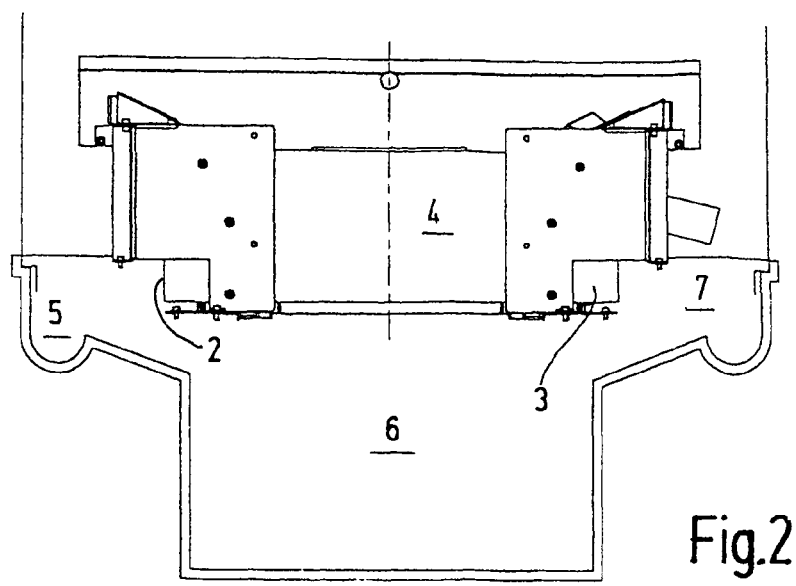
FIG. 2 shows the machine tool of FIG. 1 in a front view.
Figure 1:
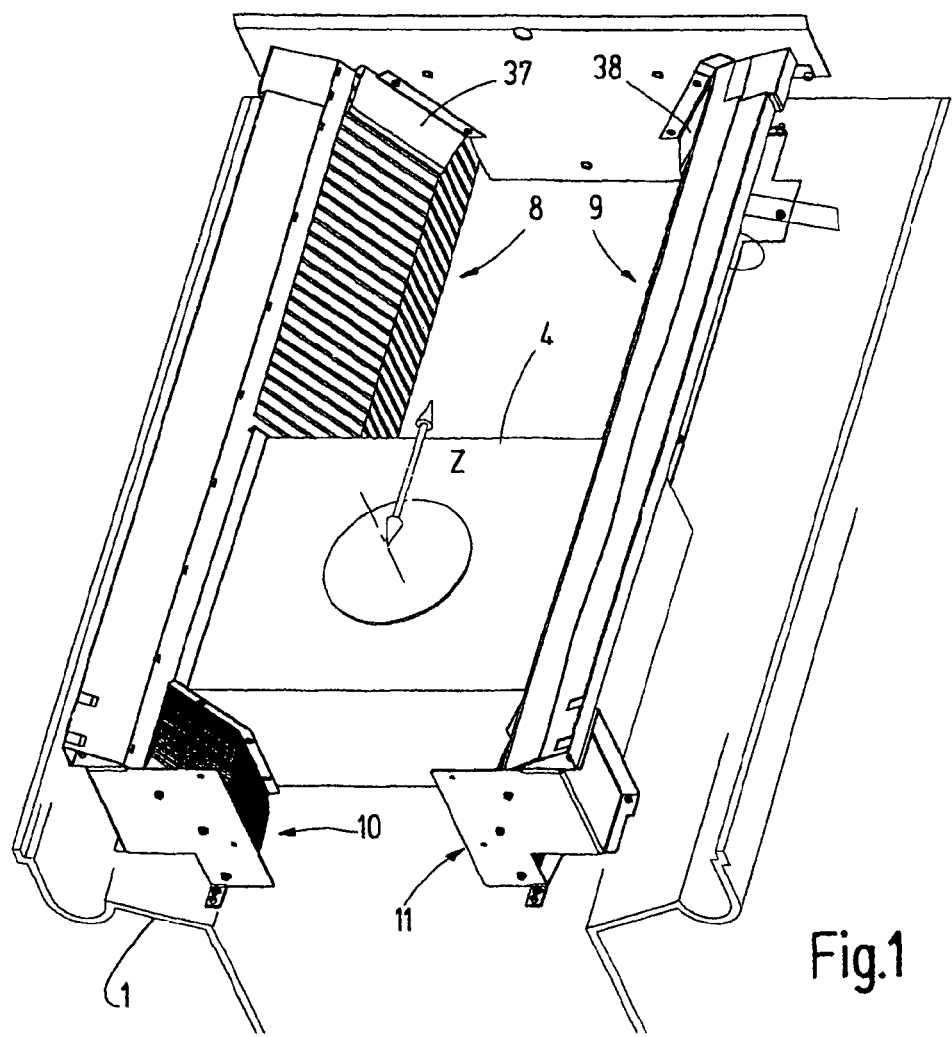
FIG. 1 shows a section of a machine tool in a perspective view.

FIGS. 1 and 2 show, as a component of a machine tool, a machine bed 1 provided with two guide structures 2, 3, shown schematically in FIG. 2. A carriage 4 is supported by the guide structures so as to be movable in the working space of the machine tool. Below the guide structures 2, 3 collections spaces 5, 6 and 7 are provided for the collection of chips and their removal from the machine.

Figure 4:
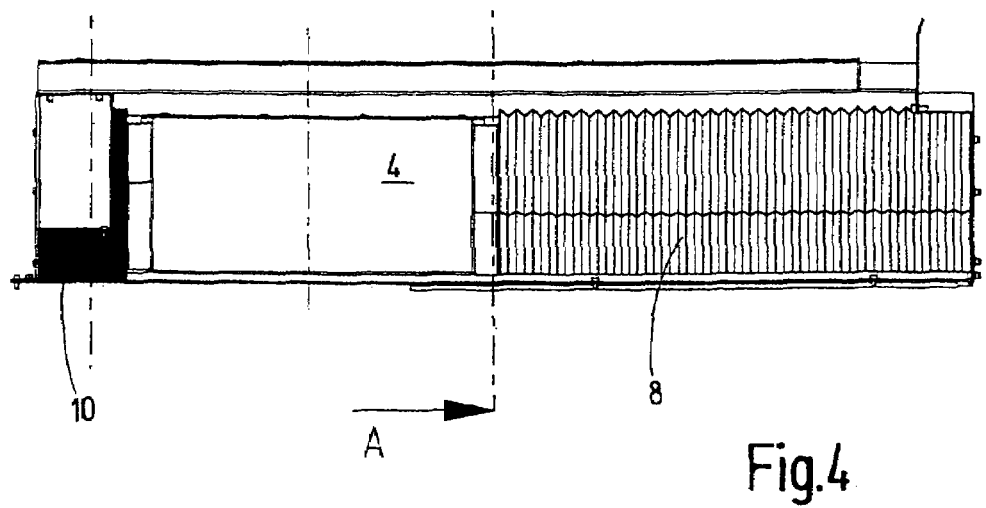
FIG. 4 shows a part of the machine tool of FIG. 1 in a cross-sectional view.
Figure 3:
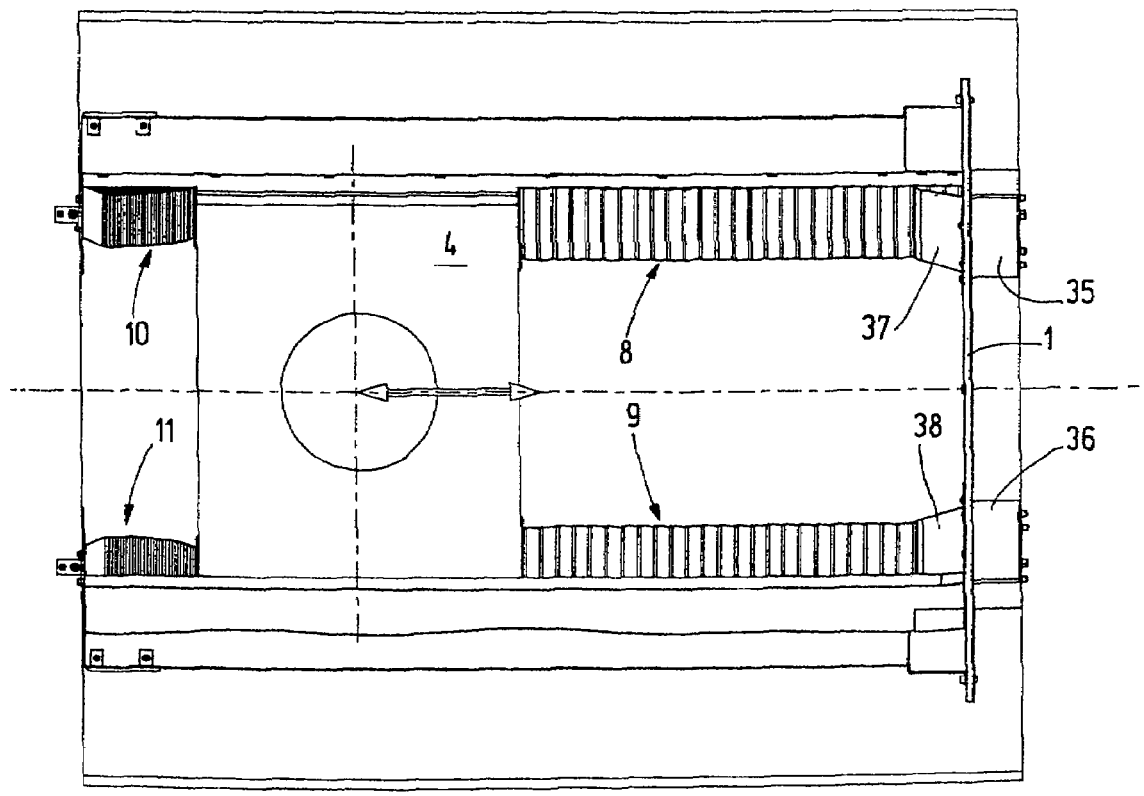
FIG. 3 is a top view of the machine tool of FIG. 1.

For the protection of the guide structures 2, 3 from chips, cover arrangements 8, 9, 10, 11 are provided as shown in FIGS. 3 and 4, each being connected with one end to the carriage 4 and the other end to the machine bed 1 or a stationary part thereof. The cover arrangements 8, 9 are arranged mirror-reversed with respect to the vertical center plane of the machine tool.

The cover arrangements 8 to 11 are telescoping in the direction of movement of the carriage 4, that is, as shown in FIG. 1, for example, in the Z direction. In this way, they permit uninhibited movement of the carriage 4 in the respective direction of movement of the carriage.

The following describes the cover arrangement 8 in detail; representative for both cover arrangements 8 and 9.

Figure 6:
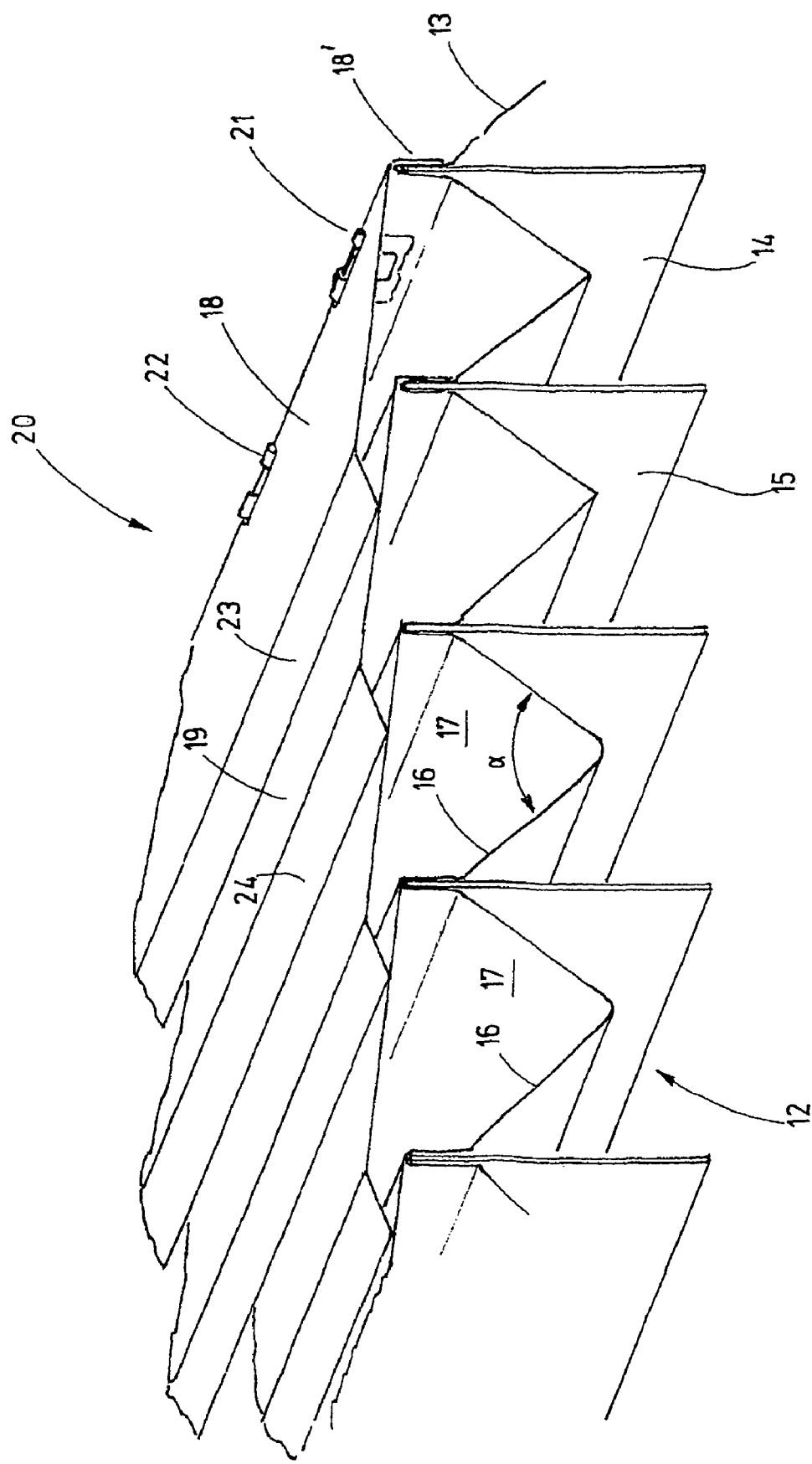
FIG. 6 shows the cover arrangement of FIG. 4 in another perspective view; and, FIG. 7 shows the cover arrangement according to FIGS. 5 and 6 in a front view.

The cover arrangement 8 compresses a pleated wall structure 12 consisting, for example, of a fiber reinforced plastic material. It includes a flexible pleated bellows structure 13 with, preferably, flexible planar intermediate wall elements 14, 15 of plastic material, as shown in FIG. 6. The bellows structure 13 is pleated so that strip-like sections 16, 17 are formed which define, there between, a variable angle $\alpha$. The sections 16, 17 are connected to the intermediate wall elements 14, 15 by cementing or welding or by any other method. Furthermore, at the upper ends of the intermediate wall elements 14, 15, as shown in FIG. 6, lamellas 18, 19, etc. are arranged, which form an armor 20 and which have angled end sections 18' via which they are supported on the upper end portions of the intermediate wall elements 14, 15 by spring clips 21, 22. The lamellas 18, 19 are angled at their free ends, that is, they are provided each with a narrow run 23, 24 which is bent toward the adjacent lamella, so that it is in line contact with the surface of the adjacent lamella. The lamellas 18, 19 are so supported by the intermediate wall elements 14, 15, so that the lamellas abut the adjacent lamellas with a contain force which, however, is not excessive.

Figure 5:
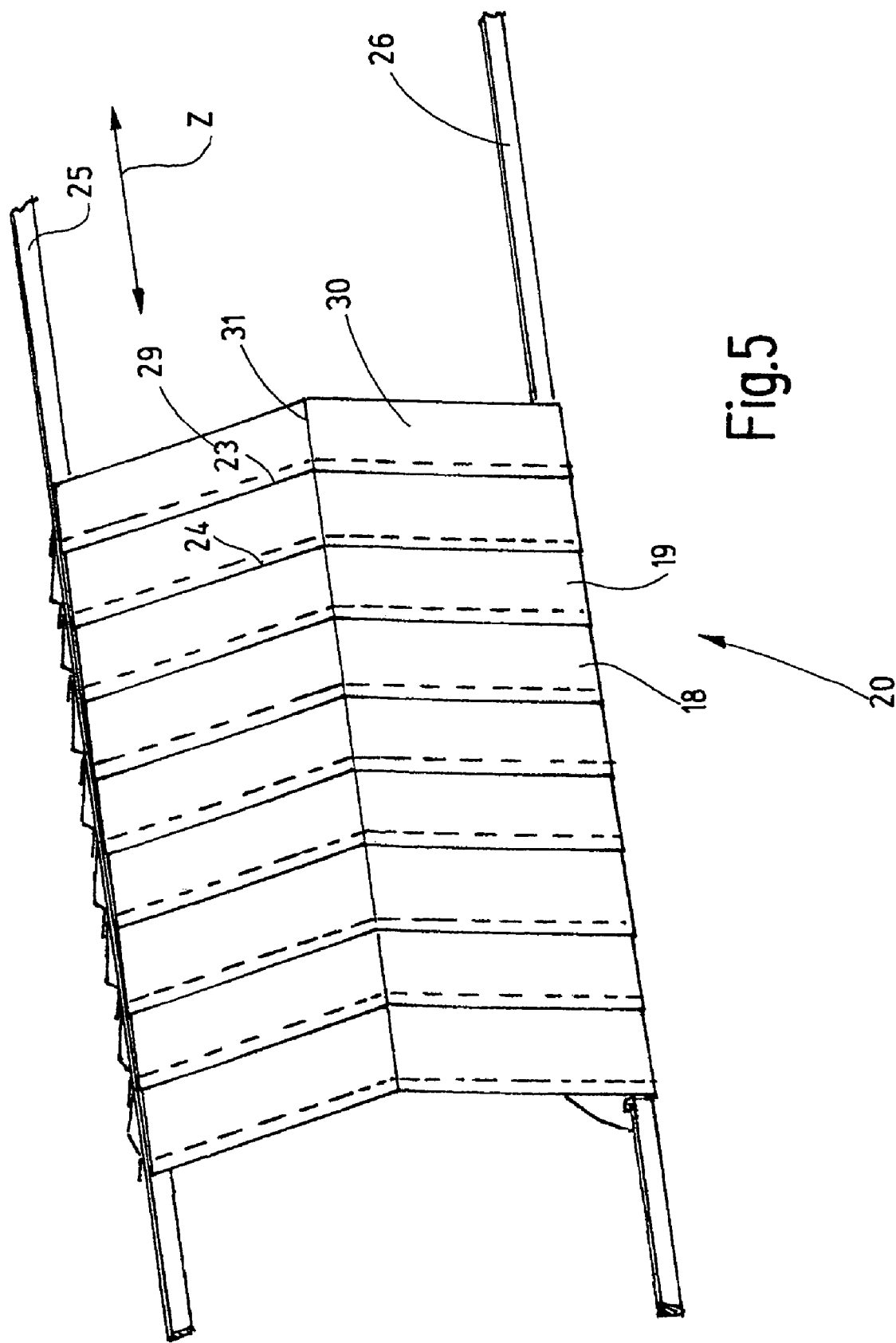
FIG. 5 shows the cover arrangement of the machine tool according to FIGS. 1 to 4, separately, in a perspective view.
Figure 7:
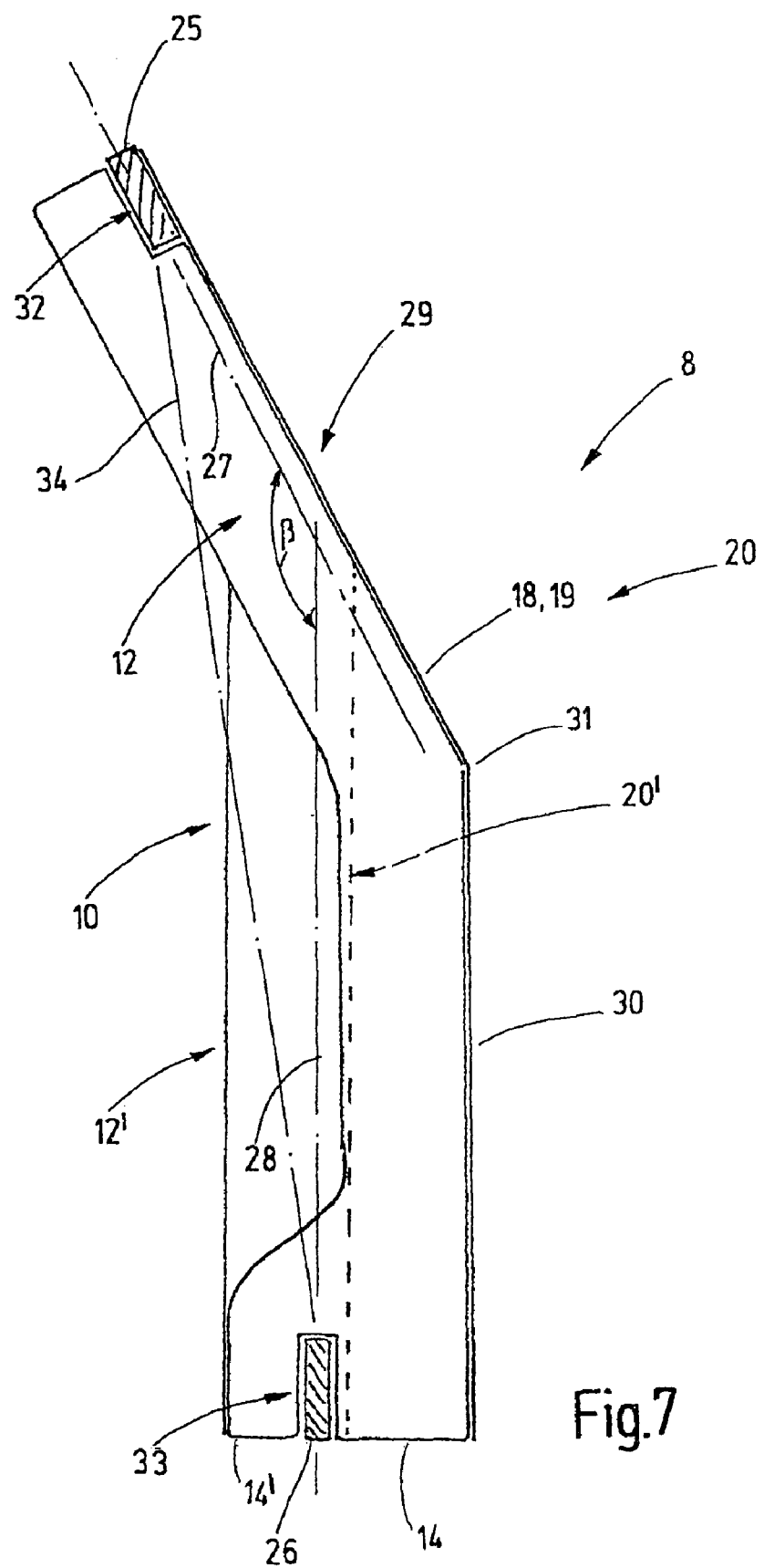

The unit formed by the pleated wall arrangement 12 and the armor 20 is, as shown in FIGS. 5 and 6, slideably supported on two guide tracks 25, 26 which extend parallel to each other in the direction of movement Z. The guide tracks 25, 26 have, for example, a rectangular cross-section as shown particularly in FIG. 7. As shown in FIG. 7, they are arranged to lie in planes 27, 28 which are shown in FIG. 7 by dash-dotted lines and which extend at an obtuse angle β. The angle β is in the range of 140 degrees to 160 degrees. It is also apparent from FIGS. 5 and 7 that the pleated wall arrangement 12 including the lamellas 18, 19 and the whole armor 20 likewise are angled at an obtuse angle β. Each lamella 18, 19 includes an upper essentially planar leg 29 and a lower preferably also planar leg 30 which may be jointed along a bending line 31. The rim areas 23, 24 may be provided in the area of the bending line 31 with an acutely angled V-shaped groove to facilitate bending and provide for better chip sealing in the angled area, not shown. The bending line 31 may be in the form of a sharp kink as shown in the figures or the bend may be rounded and extend over a contain section of the lamella 18, 19 or over the whole lamella 18, 19.

As shown in FIG. 7, guide recesses 32, 33 are formed in the cover arrangement 8 for accommodating the guide tracks 25, 26. The guide recesses 32, 33 are preferably provided in the intermediate wall elements 14, 15 and adapted to the contour of the respective guide track 25, 26. Sufficient play is provided in order to prevent cogging of the intermediate wall elements 14, 15 even if the intermediate wall elements are somewhat pivoted about a virtual axis 34 extending between the guide tracks 25, 26. The guide recess 32 is disposed at the upper end corner of the intermediate wall elements 14, 15 at the outside of the pleated wall arrangement 12 adjacent the armor 20 and oriented in an oblique direction 27. The guide recess 33 shown in FIG. 7 at the bottom of elements 14, 15 and accommodating the guide track 26 is disposed in the shown embodiment at the inside of the pleated wall arrangement remote from the armor 20 and oriented in the vertical direction 28. For providing guide recess 33 at this location, the intermediate wall elements 14, 15 have projecting wall areas 14'. As can be seen from FIG. 7, intermediate wall elements 14, 15 desirably have a boomerang shape. With reference to FIG. 7, the portions of the intermediate wall elements 14, 15 which portions are to the left of axis 34, that is the inner side of cover arrangement 8, form flexible tongues, that flex during rotation of elements 14, 15 around axis 34, for example. The flexibility and shape of intermediate wall elements 14, 15 in combination with the orientation of recesses 32, 33 makes it easy to remove the boomerang shaped elements 14, 15 when desired, by turning the cover arrangement 8 packet, for example, around axis 34, the flexible wall elements 14, 15 will flex and slip off guide tracks 25, 26.

FIG. 7 shows not only the cover arrangement 8, but also the cover arrangement 10, also, likewise, representative for the two cover arrangements 9, 11. In FIG. 7, the cover arrangement 10 is partially hidden by the cover arrangement 8. But, at least in the lower area its pleated wall structure 12' is partially visible. The armor 20' overlaps in the upper part with the armor 20 and is shown in the lower part by a dashed line. As apparent, the dashed line is closer to the guide track 26 then the armor 20. The cover arrangement 10 includes at its upper end as well as at its lower end guide recesses which are arranged at the outer side, that is at the side of the cover arrangement 10 facing the armor 20'.

The cover arrangements 8-11 operate as follows:

The cover arrangement 8-11 is attached, in each case, to the carriage 4 and, respectively, the machine bed by a suitable flange. When the carriage 4 is moved in the Z-direction the cover arrangement 8, 9, which is in front of the carriage, is pushed together while the rear cover arrangement 10, 11 is pulled apart. When they are pushed together, the lamellas overlap one another while they are partially spread away from the respective pleated wall arrangement 12, 12'. FIG. 3 shows the arrangement of a lamella packet for the cover arrangement 10, 11 where the lamellas are disposed in overlapping relationship. The resiliency required for the slight outward spreading of the lamellas is provided by the connection of the lamellas to the preferably flexible intermediate wall elements 14, 15. The lamellas 18, 19 themselves are relatively stiff, particularly since they are integral parts extending over the bend line 31. No matter whether the cover arrangement 8-11 is pushed together, that is cover arrangements 10, 11, or extended to the maximum length that is cover arrangements 8, 9, the lamellas are tightly abutting one another so that chips can not reach the pleated wall structure 12, at least not in noticeable amounts.

During movement of the carriage 4, the pleated wall arrangement 12 is deformed, as the angle α between the strips 16, 17 becomes larger or smaller. The distances between the intermediate wall elements 14, 15 of the whole pleated wall arrangement 12 remains relatively uniform over the whole length thereof. This elasticity of the area structure 13 provides for the about uniform spacing of this intermediate wall elements. The good contact between the lamellas is achieved particularly by their rigidity with respect to their bending about the axis 34. This rigidity is obtained by the bending of the lamellas along the bend line 31.

The cover arrangement 8 or 10 can be removed in a particular simple and rapid manner by disconnecting it at its ends first from the machine bed and the carriage 4. Then it is pushed together by hand until it has about the size of the packet as shown in FIG. 3 for the cover arrangements 10 or 11. It can then be pivoted about the axis 34 of FIG. 7 out of the guide tracks 25, 26. Consequently it can be removed as a packet with little effort. The normally covered guide structures are then exposed. For installation of the cover arrangement 8, the procedure is performed in reversed order. The packet comprising the pleated wall arrangement 12 and the armor 20 is again mounted by pivoting into the space between the guide tracks 25, 26 and the ends of the cover arrangement are then again connected to machine bed and, respectively the carriage 4.

The arrangement according to the invention permits the use of full length guide tracks 25, 26 which extend over the whole movement range of this carriage 4 and the machine bed 1. The cover arrangement 10, as well as the cover arrangement 8, therefore can be supported by the same guide tracks 25, 26. The same applies to the cover arrangements 9, 11. Consequently, a wider interior space is available between the cover arrangements 10, 11 than between the cover arrangements 8, 9. However, the cover arrangements 8, 9, provide at the guide structures more space in order to provide, for example, above the guide track 26 installations, such as, for example, ball bearing spindles or similar devices.

The cover arrangements 8, 9 cooperate with reception chambers 35, 36, which are arranged outside the work space and into which the lamellas can be moved. As a result, the carriage can be moved up close to the wall delimiting the work chamber. Wiper sheets 37, 38 may be provided which extend from the wall delimiting the work space into the work space and have front edges slideably disposed on the lamellas. The wiper sheets 37, 38 remove any chips deposited on the lamellas and prevent them from being carried into the reception chambers 35, 36.

The cover arrangement 8 according to the invention for machine tools and the guide structures thereof is easily removable which is made possible by supporting a pleated wall arrangement 12 and its armor 20 as a unit on guide tracks which are disposed in planes that are inclined relative to one another. The inclination facilitates the mounting and also the removal of the cover arrangement by its pivoting about an axis or direction extending between the guide tracks 25, 26.

What is claimed is:

1. A cover arrangement (8, 10) for a machine tool particularly for covering guide structures and drives, comprising:
   a pleated wall arrangement (12) expandable in a direction of movement (Z) and including a plurality of strip sections (16, 17) extending transverse to the direction of movement (Z), said strip-like sections being joined and forming in pairs therebetween an angle ($\alpha$) which is variable upon expanding or compressing the pleated wall;
   an armor (20) for protecting the pleated wall arrangement, including a plurality of lamellas (18, 19) which extend transverse to the direction of movement (Z) and are anchored to the pleated wall arrangement (12);
   said pleated wall arrangement (12) including intermediate wall elements (14, 15) extending essentially parallel to one another and having a first guide recess (32) provided at a first end of the intermediate wall element (14, 15) and a second guide recess (33) provided at a second end of the intermediate wall element (14, 15) remote from the first recess;
   a first guide track (25) is provided for the first guide recess (32) and a second guide track (26) is provided for the second guide recess (33).
   said first and second guide recesses (32, 33) are oriented away from each other and extend in planes disposed at an obtuse angle ($\beta$).

2. The cover arrangement according to claim 1, said first guide recess (32) being arranged at one side of the intermediate wall elements (14, 15) and said second guide recess (33) being arranged at the opposite side of the intermediate wall elements (14, 15).

3. The cover arrangement according to claim 1, wherein the intermediate wall elements (14, 15) are planar plates.

4. The cover arrangement according to claim 1, wherein the intermediate wall elements (14, 15) consist of a plastic material.

5. The cover arrangement according to claim 1, wherein the guide recesses (32, 33) have a depth exceeding their width.

6. The cover arrangement according to claim 1, wherein the guide recesses (32, 33) have a rectangular shape.

7. The cover arrangement according to claim 1, wherein the guide tracks (25, 26) extend in parallel spaced relationship and in planes (27, 28) extending at an obtuse angle ($\beta$) relative to each other.

8. The cover arrangement according to claim 1, wherein the guide tracks (25, 26) have an essentially rectangular cross-section.

9. The cover arrangement according to claim 1, wherein the guide tracks (25, 26) and the guide recesses (32, 33) engage each other without undercut.

10. The cover arrangement according to claim 1, wherein the lamellas (18, 19) are moveably anchored to the upper end portions of intermediate wall elements (14, 15).

11. The cover arrangement according to claim 1, wherein said lamellas (18, 19) being bent around a line (31) which extends parallel to the direction of movement (Z).

12. The cover arrangement according to claim 11, wherein the lamellas (18, 19) are bent over at an obtuse angle along a bending line (31) which extends parallel to the direction of movement (Z).

13. The cover arrangement according to claim 11, wherein the lamellas (18, 19) are formed as single pieces.

14. The cover arrangement according to claim 12, wherein the lamellas (18, 19) are provided in the area of the bending line (31) with an acutely angled V-shaped groove for facilitating bending.

15. The cover arrangement according to claim 11, wherein the armor (20) comprises lamellas (18, 19), which are identical in shape.

16. The cover arrangement according to claim 11, wherein the lamellas (18, 19) are overlapping in any expansion position of the cover arrangement (8, 10).

17. The cover arrangement according to claim 11, wherein the lamellas (18, 19) each have an edge area (23, 24) extending transverse to the direction of movement (Z) and abutting the respective adjacent lamella.

18. The cover arrangement according to claim 17, wherein the edge areas (23, 24) of the lamellas (18, 19) are angled toward the adjacent lamella.

19. The cover arrangement according to claim 1, wherein said intermediate wall element (14, 15) has a boomerang shape.

20. The cover arrangement according to claim 1, wherein the portions of the intermediate wall element (14, 15) on the inner side of the pleaded wall arrangement (12) form flexible tongues.

* * * * *